(12) United States Patent
Shankar

(10) Patent No.: US 7,886,010 B1
(45) Date of Patent: Feb. 8, 2011

(54) DIGITAL MEDIA RESOURCE MESSAGING

(75) Inventor: Krishnan V. Shankar, Sammamish, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1687 days.

(21) Appl. No.: 11/069,902

(22) Filed: Feb. 28, 2005

Related U.S. Application Data

(63) Continuation of application No. 10/028,219, filed on Oct. 24, 2001, now Pat. No. 7,080,124.

(60) Provisional application No. 60/313,503, filed on Aug. 21, 2001, provisional application No. 60/315,949, filed on Aug. 31, 2001, provisional application No. 60/324,273, filed on Sep. 25, 2001.

(51) Int. Cl.
*G06F 15/16* (2006.01)
(52) U.S. Cl. .................. 709/206; 428/626; 715/771; 348/211.2
(58) Field of Classification Search .............. 709/204, 709/223, 206; 428/626; 715/771; 348/211.2
See application file for complete search history.

(56) References Cited

U.S. PATENT DOCUMENTS

| | | | |
|---|---|---|---|
| 5,736,982 A | 4/1998 | Suzuki et al. ............... 345/330 |
| 5,740,549 A | 4/1998 | Reilly et al. ................... 705/14 |
| 5,913,032 A | 6/1999 | Schwartz et al. ........ 395/200.43 |
| 5,913,040 A | 6/1999 | Rakavy et al. .......... 395/200.62 |
| 5,930,473 A | 7/1999 | Teng et al. ............. 395/200.34 |
| 6,021,443 A | 2/2000 | Bracho et al. ................ 709/241 |
| 6,138,162 A | 10/2000 | Pistriotto et al. ............ 709/229 |
| 6,173,311 B1 | 1/2001 | Hassett et al. ............... 709/202 |
| 6,226,684 B1 | 5/2001 | Sung et al. .................. 709/238 |
| 6,324,587 B1 | 11/2001 | Trenbeath et al. ........... 709/310 |
| 6,338,086 B1 | 1/2002 | Curtis et al. ................. 709/218 |
| 6,424,998 B2 | 7/2002 | Hunter ....................... 709/207 |
| 6,560,707 B2 | 5/2003 | Curtis et al. ................. 713/163 |
| 6,668,273 B1 | 12/2003 | Rust ............................ 709/204 |
| 6,772,335 B2 | 8/2004 | Curtis et al. ................. 713/163 |
| 6,795,711 B1 | 9/2004 | Sivula .......................... 455/466 |
| 6,807,558 B1 | 10/2004 | Hassett et al. ............... 709/203 |
| 6,884,172 B1 | 4/2005 | Lloyd et al. .................... 463/42 |
| 6,947,738 B2 | 9/2005 | Skog et al. ................ 455/426.1 |
| 6,957,396 B2 * | 10/2005 | Iwamura ..................... 715/771 |
| 6,957,398 B1 * | 10/2005 | Nayeri ........................ 715/867 |
| 2001/0020247 A1 | 9/2001 | Ikeda et al. .................. 709/206 |
| 2003/0005053 A1 | 1/2003 | Novaes ........................ 709/204 |

(Continued)

OTHER PUBLICATIONS

Berger, Sandy, "Ceiva Picture Frame," Dec. 1, 2000, CompuKiss®, retrieved Aug. 1, 2005, from http://www.compukiss.com/populartopics/photoprintinghtm/review99.htm, 3 pages.

(Continued)

*Primary Examiner*—Tammy T Nguyen
(74) *Attorney, Agent, or Firm*—Seed IP Law Group PLLC

(57) ABSTRACT

A digital media resource messaging system provides a convenient digital media resource viewing, managing, organizing, and editing platform that facilitates enhanced resource exchange by storing and forwarding digital media resources via a server between multiple resource-sharing partners designated by the user. In one embodiment, the digital media resource messaging system includes services to view, manage, organize, edit, and exchange digital images and video sequences.

40 Claims, 8 Drawing Sheets

U.S. PATENT DOCUMENTS

2004/0101709 A1* 5/2004 Chen .................. 428/626
2004/0201709 A1* 10/2004 McIntyre et al. ......... 348/211.2
2004/0201711 A1* 10/2004 Lopaz .................. 348/211.99

OTHER PUBLICATIONS

Ceiva Logic, Inc, "Ceiva Digital Picture Frame," 2000, Ceiva Logic, Inc., West Hollywood, CA, USA, retrieved from http://www.ceiva.com, 2 pages.

Ceiva Logic, Inc, "Ceiva™ Internet-Connected Digital Picture Frame—User's Guide," 2000, Ceiva Logic, Inc., West Hollywood, CA, USA, retrieved from http://www.ceiva.com, 16 pages.

Ceiva Logic, Inc. "The Ceiva Network," retrieved Aug. 1, 2005, from http://www.ceiva.com, 2 pages.

Mather, John, "All the News That's Fit to . . . Pointcast?" retrieved Aug. 1, 2005, from http://wwwiz.com/issue06/wiz_f05.html, 4 pages.

Ozer, Jan, "Your Best Shots," Aug. 1, 2001, retrieved Aug. 1, 2005, from http://www.pcmag.com/print_article2/0,1217,a=7073,00.asp, 4 pages.

"Polaroid PhotoMAX Digital Picture Frame, User's Guide," 2000, retrieved from http://www.Polaroid.com/service/userguides/digital/dig_frame_ug.pdf, 25 pages.

Watson, Jennifer, et al., *Your Official America Online Tour Guide*. Hungry Minds Inc., 6*th* Edition, Nov. 1, 2000.

* cited by examiner

DIGITAL MEDIA RESOURCE MESSAGING

RELATED APPLICATIONS

This non-provisional application claims priority to provisional application No. 60/313,503 entitled "System And Method For Sharing And Viewing Digital Pictures" filed on Aug. 21, 2001, provisional application No. 60/315,949 entitled "System And Method For Sharing And Viewing Digital Pictures" filed on Aug. 31, 2001, and provisional application No. 60/324,273 entitled "System And Method For Sharing And Viewing Digital Pictures" filed on Sep. 25, 2001, the specifications of which are hereby fully incorporated by reference.

BACKGROUND OF THE INVENTION

1. Field of the Invention

The invention relates generally to the field of data processing and, in particular to the exchange, display and manipulation of digital media resources such as image and video files.

2. Background Information

Over the years, digital imaging has gained considerable popularity with both consumers and professionals alike. In the past, individuals would use an optical scanner to digitize conventional print-based photographs in order to create an electronic version of the image that could be manipulated and/or exchanged with colleagues as well as friends and family. Although optical scanners remain in use today, digital photography involving the use of digital cameras to capture multiple high-resolution color images which are then digitally stored in a memory storage device rather than onto conventional emulsion-based film, has continued to gain attention. Because the digital images are stored in memory, they may be instantly viewed on the camera (i.e. using an included display screen) without the need for lengthy and costly development processes required by conventional film. Additionally, as soon as the electronic images are captured, they may be uploaded to a computer for subsequent exchange with friends and family via the Internet for example.

In the past, individuals having access to the Internet were limited to using electronic mail as a means of exchanging digital images. Although this was considered a relatively fast way of exchanging images with people in varied locations around the world, the various user interfaces available for sending the images proved difficult to use. For example, if a user wished to email images to multiple parties, the user would either have to send individual email messages to each desired recipient, which proved time consuming, or send a single message addressed to each recipient on a mailing list. Although the mailing list accelerated image distribution, there was there was no straightforward way to designate that different pictures be sent to different addressees without creating separate mailing lists. Once the recipient received the email, they had to download and save the attached images, which frequently resulted in the user losing track of where they saved these images. Furthermore, to view the images, the user would have to click on the images one by one and open and view them individually in a web browser or other imaging application. If the images were too large to fit the available viewing area, the user would be forced to use a zoom function, if available, in order to view the image in its entirety, or be forced to pan across the image.

With the increase in popularity of the World Wide Web coupled with readily available web page editing software, individuals soon began to create personal web sites to display their various digitized photographs and electronic images to family and friends. Although this method provided one way to display images to a geographically diverse group of people, there was often very little security associated with such personal web sites allowing more than the intended audience to view one's personal images. Additionally, the intended viewing audience of the personal web site would have to repeatedly check back in order to determine if the web site owner/editor posted any new pictures. Further still, all image viewing was required to be conducted while the viewer remained on-line. If a given portfolio contained high-resolution images for example, the downloading and viewing time could be considerable. Furthermore, the user had to have at least some familiarity with how to author a web page containing these pictures.

To address the various privacy issues and other limitations involving the posting of images, photo-sharing services were introduced. As with personal web pages, these photo-sharing web sites enabled individuals to upload and store digital images that could be viewed by others over the Internet. The main difference was that the images would be stored in an area of the web site dedicated to that individual and could be password protected to limit viewing by unintended parties. Notwithstanding this, however, image viewing still needed to be conducted on-line, which resulted in very poor performance due in part to the unreliably variable speed of response from the Internet. Any picture editing functionality provided by the website was even more adversely affected by the unreliable speed of response. Additionally, the service providers hosting the photo-sharing services were required to maintain extremely large file storage capacities as each image is filed on a photo-sharing server for perpetuity.

More recently, digital picture frames have been introduced as another mechanism for sharing digital images. Briefly, digital picture frames are special purpose devices that contain liquid crystal display (LCD) screens (typically in the 5"×7" or 8"×10" size range) that are capable of displaying digital images of a limited resolution. One particular digital picture frame available from Ceiva Logic, Inc. of Burbank, Calif. uses a standard telephone line to connect to a picture server in order to download a predefined number of images. Before the images may be downloaded to the digital picture frame, however, the owner or another party authorized by the owner must first upload these images to the picture server through the use of a separate browser-equipped computer or appliance. Additionally, while the digital picture frame is downloading the images, the phone line is tied up thereby preventing other tasks such as web browsing or email to be contemporaneously carried out. Furthermore, digital picture frames do not provide image editing and/or manipulation capabilities. For example, users cannot prevent some pictures from being displayed, or brighten them up, and so on. Also, the images displayed on the digital picture frames cannot be shared with other friends or concurrently viewed by multiple parties. For example, if a grandmother who owns a digital picture frame were to receive images of her granddaughter uploaded from by her son, the grandmother would not be able to share the images with anyone over the Internet let alone anyone outside of the view of the digital picture frame.

BRIEF DESCRIPTION OF THE DRAWINGS

The invention is illustrated by way of example, and not by way of limitation in the figures of the accompanying drawings in which like reference numerals refer to similar elements, and in which.

DETAILED DESCRIPTION

A digital media resource messaging system is described herein. In one embodiment, a photo-management software client provides a convenient image viewing, managing, and editing platform that facilitates enhanced image exchange by storing and forwarding image files via a server between, multiple resource-sharing partners designated by the user. In the following description, unless otherwise noted, the terms "image", "photo", "photograph", and "picture" are used interchangeably to refer to digital images that are capable of being rendered on a display device such as a CRT or liquid crystal display (LCD) for example. Furthermore, the phrase "digital media resource" is intended to be broadly construed to refer to digital images as well as digital video, one or more digital video frames, and even text files and other documents. Additionally, the term "buddy" is used herein to refer to one or more resource-sharing partner(s) with whom the user may opt to share one or more digital media resources. Moreover, a "buddy list" refers to a list of individuals (whether represented by first and/or last name, username, or email address) with whom a user has chosen to share digital media resources.

For purposes of explanation, specific numbers, materials and configurations are set forth in the following description in order to provide a thorough understanding of the invention. It will be apparent, however, to one skilled in the art that the invention may be practiced without these specific details. In some instances, structures and devices are shown in block diagram form in order to avoid obscuring the invention. In other instances, well-known features are omitted or simplified in order not to obscure the present invention. For ease of understanding, certain method steps, are delineated as separate steps, however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
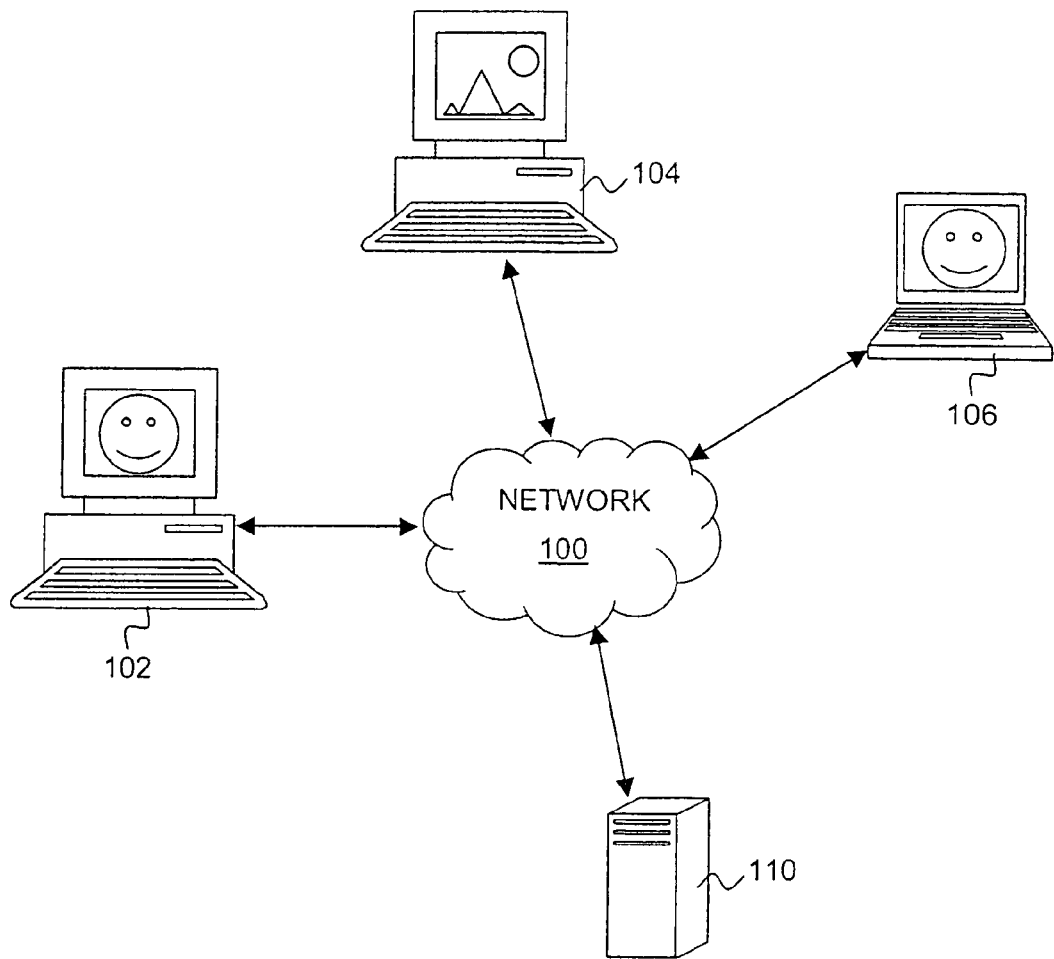
FIG. 1 illustrates an overview of the present invention.

FIG. 1 illustrates an overview of the present invention in accordance with one embodiment. In FIG. 1, a digital media resource messaging system is illustrated. The digital media resource messaging system includes computer systems 102, 104, 106 and server 110, each communicatively coupled together via network 100 and incorporated with the teachings of the present invention. Computer systems 102, 104 and 106 each represents a general-purpose computer system such as, but not limited to a desktop computer, laptop computer, and palmtop computer, as well as a personal digital assistant (PDA). Each of computer systems 102, 104, 106 is equipped with a display device such as a CRT or LCD to display one or more digital media resources including images that may be shared with one or more resource sharing partners. For the purpose of this discussion, the respective users (not shown) of computer systems 102, 104, 106 are each assumed to be resource-sharing partners with one another. That is, each respective user of computer systems 102, 104, 106 has been identified to each other user (e.g. through a graphical user interface "GUI" described below) as a resource-sharing partner.

For example, in accordance with the teachings of the present invention, the user of computer system 102 may elect to share one or more images with the user(s) of computer system(s) 104 and/or 106 as resource-sharing partners. The image(s) may be stored locally on computer system 102 or remotely on another data storage device within the messaging system of FIG. 1. In an embodiment where the images are stored locally on the originating (i.e. uploading) computer system, the corresponding user is prompted (again through a GUI) to identify which digital media resources are to be shared with one or more other resource-sharing partner recipients. In one embodiment, once the digital media resources have been identified, they are uploaded to server 110 where they are temporarily stored until the next subsequent login by the designated resource-sharing partner recipient(s). In other embodiments, server 110 stores the resources for a predetermined length of time, such as a period of weeks, and purges the resources after that duration, whether or not all the intended recipients have logged in and downloaded the resources.

Upon logging in to server 110, the stored digital media resources are transparently downloaded (either automatically, or upon the recipient's explicit approval, e.g. depending on which option the recipient has selected for resource downloads) to each designated recipient's respective computer system in the background leaving the recipient(s) free to perform any number of other tasks such as viewing, editing or sharing resources, browsing the web, checking email, and so forth. In accordance with the present invention, both sender and recipient need not be logged in to the server at the same time in order to share digital media resources. In one embodiment, the digital media resources are uploaded to, and downloaded from server 110 using the well-known hypertext transfer protocol (HTTP). In some embodiments, the system may also use other protocols than HTTP, for example FTP or TCP-IP. Once the digital media resources have been downloaded (or prior to uploading), the recipient user is able to perform any number of tasks on or with the digital media resources. For example, in the event the digital media resources comprise digital images, a user recipient may have the option of viewing the downloaded images, editing the images, organizing the images, and so forth. In one embodiment, the downloaded digital media resources are automatically displayed on the corresponding computer system in the form of a screen saver, whereas in another embodiment, the downloaded digital media resources are automatically displayed in the form of background wallpaper on the display device. In other embodiments, the downloaded digital media resources may be displayed as part of an Active Desktop on the corresponding computer system, or even on a TV screen.

In one embodiment, once the digital media resources have been downloaded to one or more computer systems, server 110 removes the digital media resources from memory thereby decreasing perpetual storage requirements of server 110. Additionally, since the digital media resources are downloaded to the various computer systems, the digital media resources may be viewed or accessed offline by the users, thereby eliminating delays caused by slow and often unreliable network connections. In one embodiment, server 110 generates and stores a meta-data file in association with each digital media resource the server receives. The meta-data file may include items of information such as the resource file name, file size, content type, creation date, who uploaded the resource and when, as well as who downloaded the resource and when. The meta-data files facilitate resource searches by server 110 without the need to uncompress any stored resource files. These resource searches can be constrained to specific criteria and combinations of criteria, such as locating all files created by user "Jim" after Oct. 16, 2001 and smaller than 500K. In one embodiment, if a user requests a digital media resource that has since been deleted from server 110, the server utilizes the meta-data files to send a message to those prior resource recipients requesting a copy of the digital media resource. Once again, this acts to decrease the amount of storage space needed on server 110.

Network 100 represents any of a variety of communications networks equipped to transport data between various communication devices such as those illustrated in FIG. 1 for example. In one embodiment, network 100 represents a transmission control protocol/internet protocol (TCP/IP) based network such as, but not limited to the Internet. In other embodiments network 100 may represent a local area network (LAN), a wide area network (WAN), or some combination thereof. In yet another embodiment, any one or more of computer systems 102, 104, 106 may be directly coupled to each other and/or server 110 in addition to or in place of the illustrated connections to network 100. Although three general-purpose computer systems are illustrated in FIG. 1, a fewer or greater number of computer systems may instead be coupled to network 100 without departing from the spirit and scope of the invention.

Figure 2:
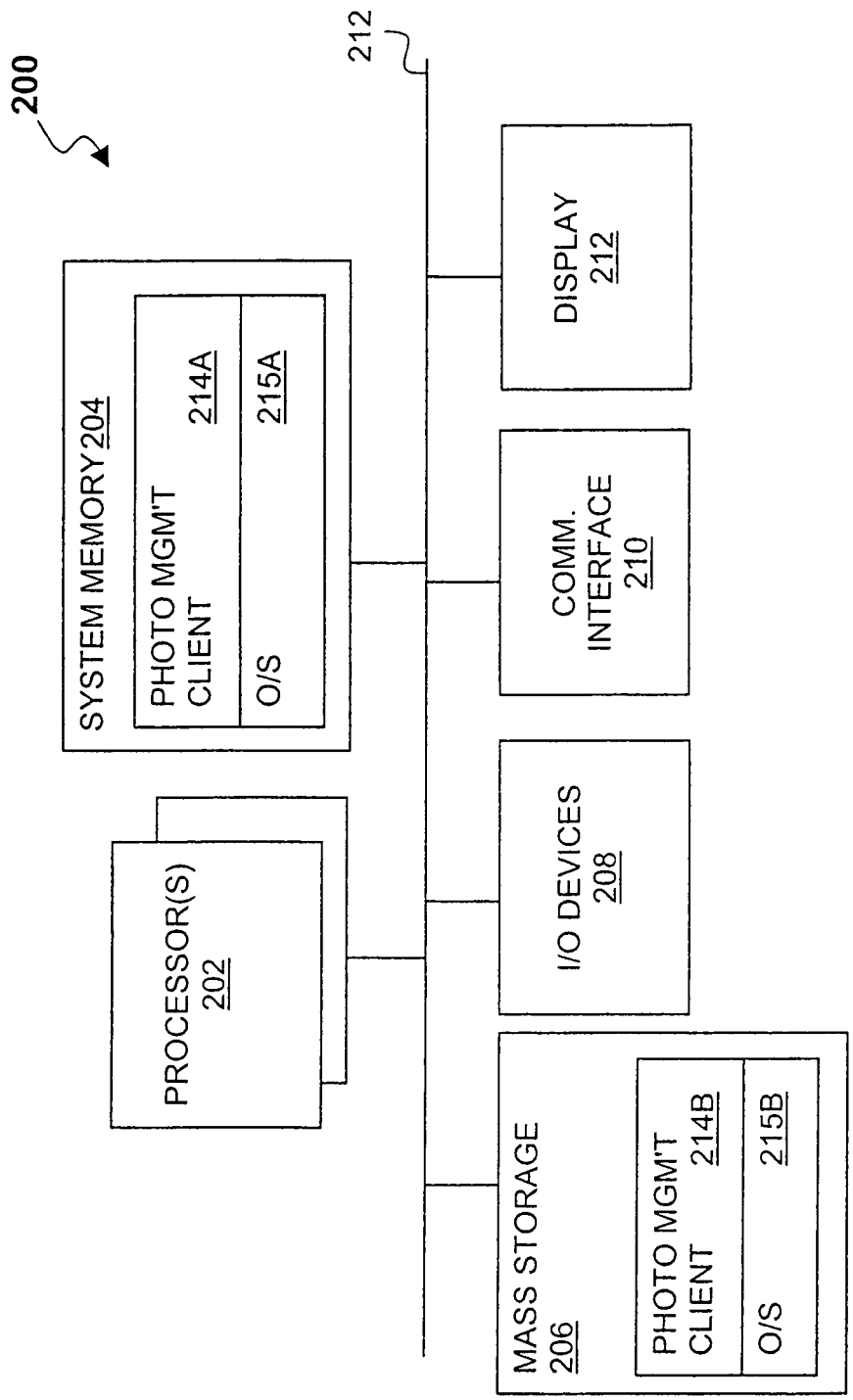
FIG. 2 illustrates an example computer system suitable for practicing the present invention in accordance with one embodiment.

FIG. 2 illustrates an example general-purpose computer system suitable for use in association with the digital media resource messaging system of the present invention in accordance with one embodiment. As shown, computer system 200 includes one or more processors 202 and system memory 204. Additionally, computer system 200 includes one or more mass storage devices 206 (such as diskette, hard drive, CDROM, DVDROM, CD/RW and so forth), input/output devices 208 (such as a keyboard, cursor control devices and so forth), communication interfaces 210 (such as network interface cards, modems and so forth), and display interfaces/devices 212. The elements are coupled to each other via system bus 212, which represents one or more buses. In the event that system bus 212 represents multiple buses, the busses may be bridged by one or more bus bridges (not shown).

Except for the teachings of the present invention, each of these elements performs its conventional functions known in the art. In particular, system memory 204 and mass storage 206 are employed to respectively store a working copy and a permanent copy of the programming instructions implementing the photo-management client 214 of the present invention, in addition to operating system 215. The permanent copy of such programming instructions may be loaded into mass storage 206 in the factory, or in the field, as described earlier, through a distribution medium (not shown) or through communication interface 210 (from a distribution server (not shown). The constitution of these elements 202-212 are known, and accordingly will not be further described.

Figure 3:
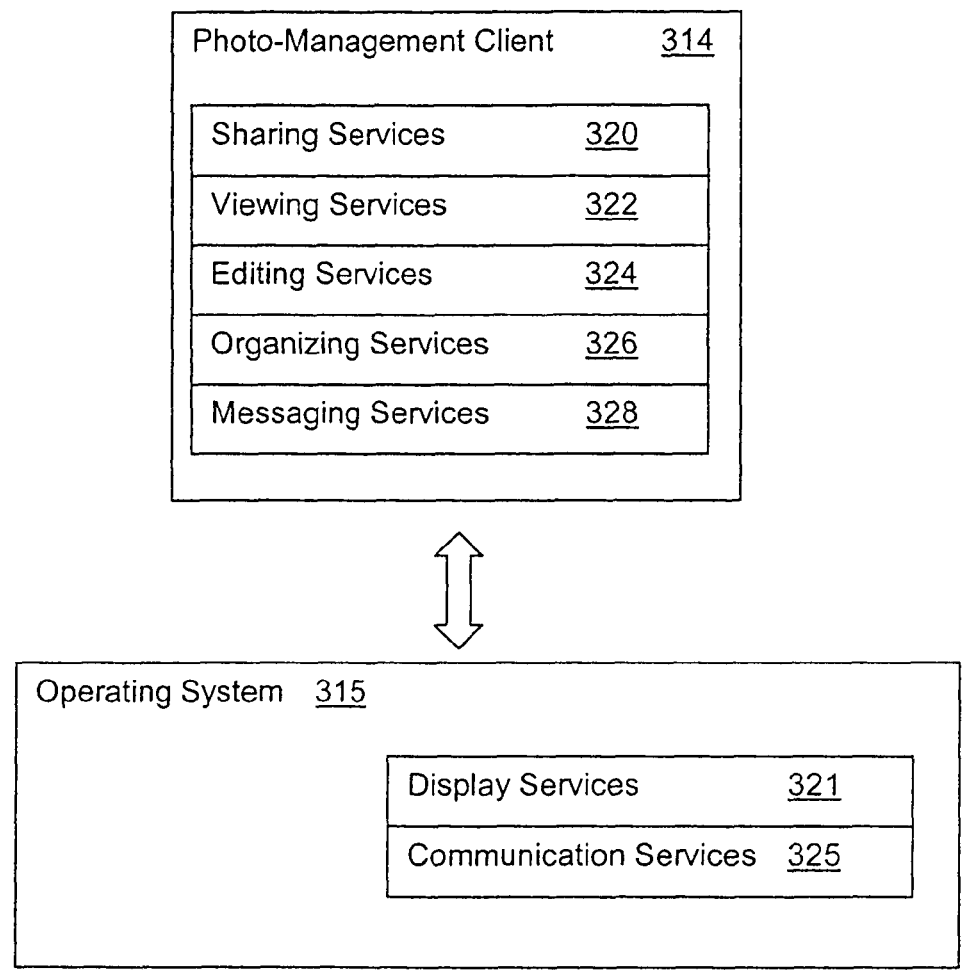
FIG. 3 illustrates software elements of the general-purpose computer system described above with respect to FIG. 2, in accordance with one embodiment.
Figure 7:
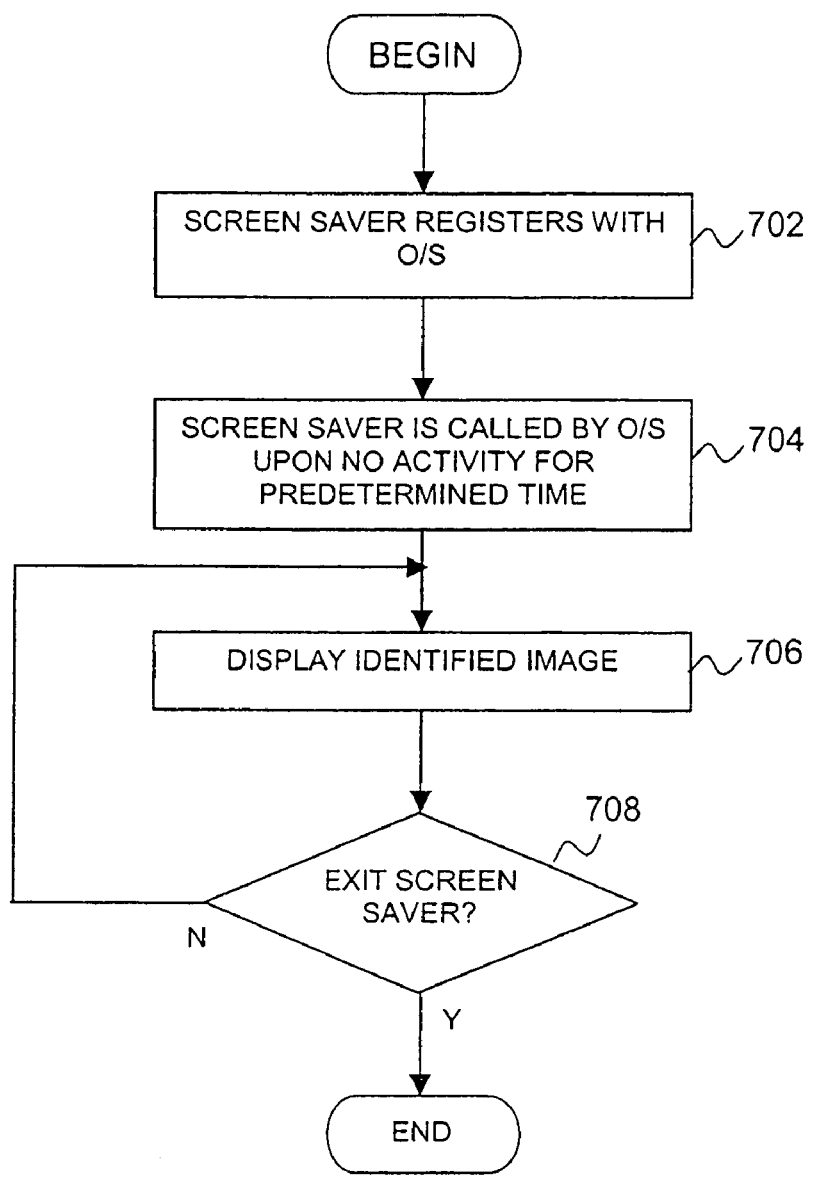
FIG. 7 illustrates an operational flow of a screen saver operational flow in accordance with one embodiment of the present invention.

FIG. 3 illustrates various software elements of the general-purpose computer system described above with respect to FIG. 2. In one embodiment, operating system 315 represents a Windows-based operating system such as WINDOWS™ 95, 98, or 2000, XP available from Microsoft Corporation of Redmond, Wash. Operating system 315 is shown to include display services 321, and communication services 325, among other functions. Communication services 325 facilitate input/output communication, including network communication, between the host computer system and external devices. In one embodiment, communication services 325 further include TCP/IP and socket services. Display services 321 facilitate the rendering of images on a display device such as a CRT or LCD. In one embodiment, display services 321 include a screen saver in the form of an application programming interface (API) that may be called by the system when, for example, the system has not detected any input/output activity during a user determinable period, or by manual activation by the user. For example, FIG. 7 illustrates an operational flow of a screen saver in accordance with one embodiment of the present invention. To begin, the screen saver is first registered with the operating system using e.g. a screen saver ID, block 702. Next, upon detecting no input/output activity for a pre-set interval of time, the operating system calls the screen saver API, block 704. When executed the screen saver API causes one or more selected digital media resources to be displayed, block 706. The screen saver then remains in an execution mode until e.g. input/output is detected, block 708.

As alluded to earlier, photo-management client 314 represents a software client that may be executed by one or more of computer systems 102, 104, and 106 to facilitate enhanced digital media resource exchange between multiple designated resource-sharing partners. In the illustrated embodiment, photo-management client 314 includes sharing services 320, viewing services 322, editing services 324, organizing services 326, and messaging services 328. Although not pictured, photo-management client 314 may further include printing services to facilitate local or third party printing of digital media resources including photos and documents.

In one embodiment, sharing services 320 provide various functionalities including the ability to share one or more digital media resources with one or more buddies by way of a user-friendly graphical interface. Viewing services 322 facilitate the viewing of downloaded digital media resources (i.e. in the form of images or video) as well as the previewing of digital media resources to be uploaded. Editing services 324 similarly facilitate manipulation and augmentation of images that have been downloaded or are to be uploaded. In one embodiment, organizing services 326 facilitate organizing and consolidating digital media resources including those resources resident locally on the user's computer system, those resources received from one or more buddies, and those resources sent to one or more buddies. In one embodiment, the digital media resources may be organized into collections using a hierarchical directory structure. In one embodiment, messaging services 328 provide messaging capabilities to the host computer system such that a user may exchange text, video and audio content with another user or resource-sharing partner. For example, in one embodiment of the invention, any resource-sharing partner may initiate a text or voice chat session with any other resource-sharing partner while the shared resources are concurrently displayed on the corresponding computer systems. Accordingly, two users may "chat" about one or more images concurrently displayed upon each user's respective display device. In one embodiment, messaging services 328 further facilitate the exchange and synchronization of resource meta-information. For example, one user may assign a rating to a particular resource, which is then conveyed to the server. The server then consolidates each rating received from various users for a given resource into an average rating for the resource. Each client who is known by the server to have received a copy of this resource is then updated/synchronized with the updated average rating the next time they log in. Additionally, the server may similarly update/synchronize other user-provided feedback including but not limited to resource-related comments.

Figure 4:
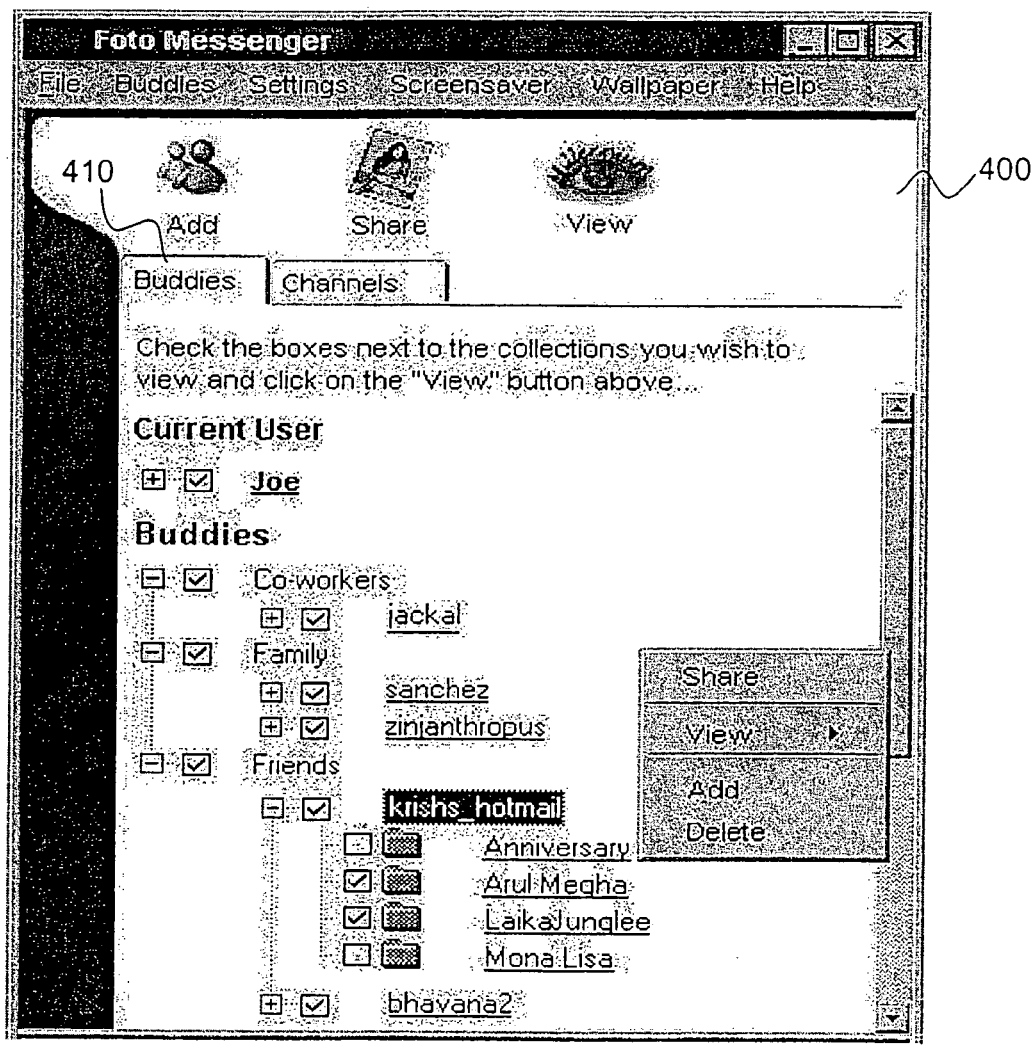
FIG. 4 represents one embodiment of a graphical user interface dialog illustrating a multi-contextual hierarchical directory tree of the photo-management client.

FIG. 4 represents one embodiment of a graphical user interface dialog illustrating a multi-contextual hierarchical directory tree of the photo-management client. Among other features, dialog 400 illustrates buddy tab 410, which when selected displays the current user (i.e. by pre-selected username), the current user's buddies and buddy lists, as well as image collections received from each buddy. In the graphical dialog of FIG. 4, the current user logged into the photo-management client is identified as "Joe" and Joe's buddy lists include "Co-workers", "Family" and "Friends". Under each Buddy List are shown individual buddies that belong to this list. In FIG. 4, the buddy list "Family" contains the buddies "sanchez" and "zinjanthropus" displayed under it. Under each buddy is shown the picture collections received by "Joe" from that particular buddy. In the illustrated example, Joe has received four picture collections from his buddy "krishs_hotmail": Anniversary, ArulMegha, LaikaJunglee, and Mona Lisa. Furthermore, under the current user's own name are a list of collections he himself has created. In the illustrated embodiment, the buddy and collection lists can either be listed in the dialog or made hidden by clicking on the "+" and "−" signs preceding the buddy list name and the buddy name. Moreover, in accordance with the teachings of the present invention, the user can choose to have individual picture collections or all picture collections from a given user either displayed or not displayed within a client viewer, as wallpaper, or as a screensaver by checking or unchecking the check boxes preceding the buddy list, buddy and picture collection names.

In one embodiment, the photo-management client can be integrated with shell and user interface of Windows based operating systems. This allows users to initiate chatting with buddies, sharing/organizing/viewing of pictures, and managing their buddy lists from anywhere in the Windows interface, not just from the photo-management client user interface. Accordingly, a user may elect to share digital media resources with buddies in any of a number of ways. For example, a user may use the right-click feature of Windows and other operating systems to find out which buddies, if any, he has shared a particular resource with. Similarly, a user can right-click on a particular file or folder in order to share it with the user's buddies. Alternatively, the user may also use the dialog tool bar, menu, or task pane to elect to share a resource in addition to using the right-click function.

Figure 5:
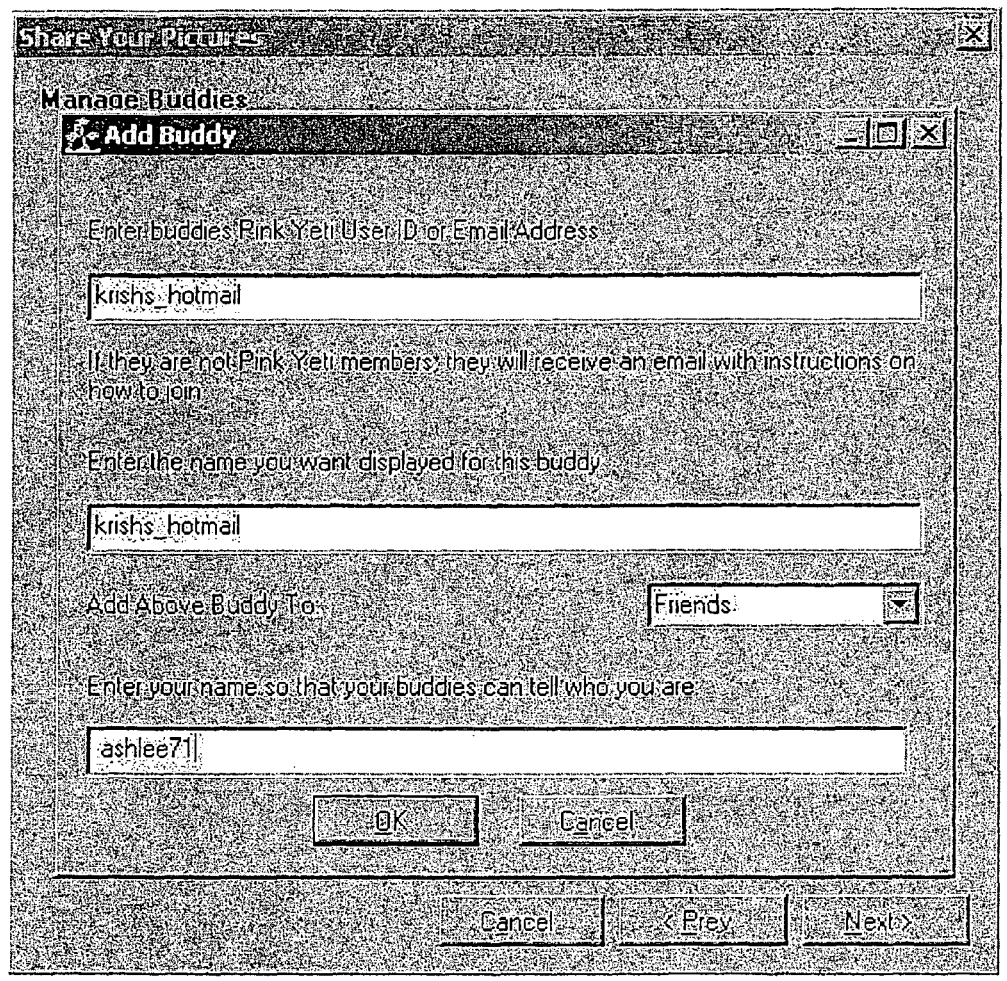
FIG. 5 illustrates one embodiment of a graphical user interface dialog for identifying new buddies.

FIG. 5 illustrates one embodiment of a graphical user interface dialog for identifying new buddies. In one embodiment, individuals may be added to a buddy list using a login username or an email name. If the buddy is added using a login name, the buddy will be notified of newly shared resources upon their next login to server 110. If, however, the buddy is added using an email name, the buddy will be notified of newly shared resources by way of an email message delivered to the associated email account. In one embodiment, the email message invites the buddy recipient to become a member of a resource-sharing network.

Figure 6:
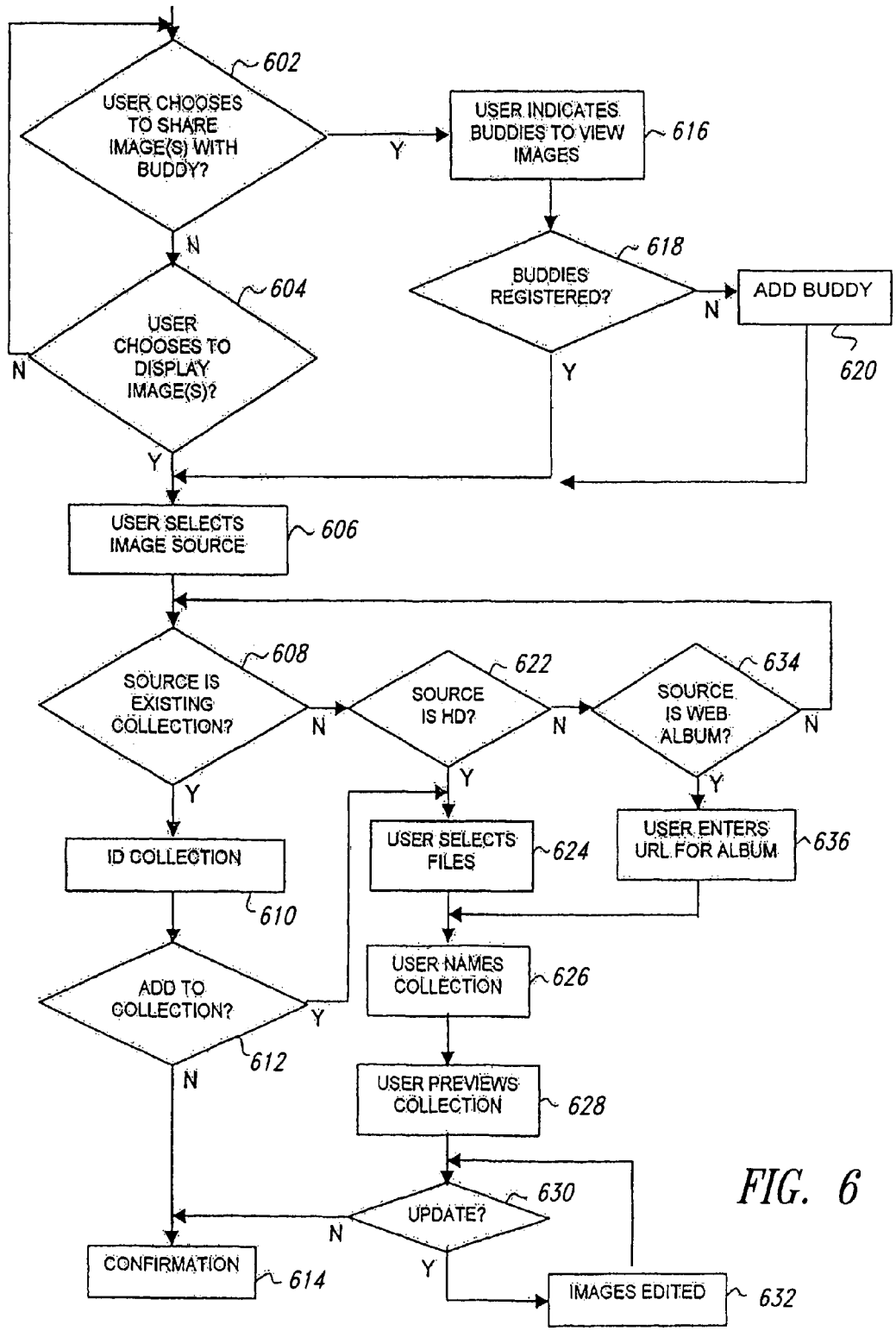
FIG. 6 is a flow diagram illustrating an operational flow of the user interface of the present invention, in accordance with one embodiment.

FIG. 6 is a flow diagram illustrating an operational flow of the user interface of the present invention, in accordance with one embodiment. The process begins with the user electing to perform some operational function within the photo-management client of the present invention. At block 602, the system determines whether the user has chosen to share one or more digital media resources (in this example, one or more images) with a buddy. If so, the user is prompted to select which buddies should receive the shared images, block 616. If the buddies are not already registered in the user's buddy list (block 618), the user is provided with an opportunity to add the buddies (block 620) before continuing to select the image source(s), block 606.

If at block 602, the user does not choose to share images with a buddy but instead chooses to display one or more images on a corresponding display screen, block 604, the user is then prompted to select the image source(s). If the user has identified one or more image sources that are part of an existing image collection, block 608, the user is prompted to identify the collection, block 610. At block 612 the user may then add additional images to a preexisting collection, or otherwise confirm the user's pending action, block 614. If back at block 608 it was determined that the image source was not part of an existing collection, the user is queried as to whether the image source is located on the local hard drive, block 622. If so, the user selects the image sources, block 624, and gives a name to the new collection of images created by such selection, block 626. At block 628, the user is provided with an opportunity to preview the collection of image resources and update them (e.g. add/delete) if it is deemed desirable, blocks 630 & 632. If the source of the image is not an existing collection (block 608) or a local hard drive (block 622), the image source may be a WWW album from one or more Internet photo sharing services, block 634. If the image source is indeed a web album from one or more Internet photo sharing services, the user is prompted to enter the URL identifying the album, block 636. Thereafter, the user is prompted to name the newly created image collection and preview/update if desired.

Figure 8:
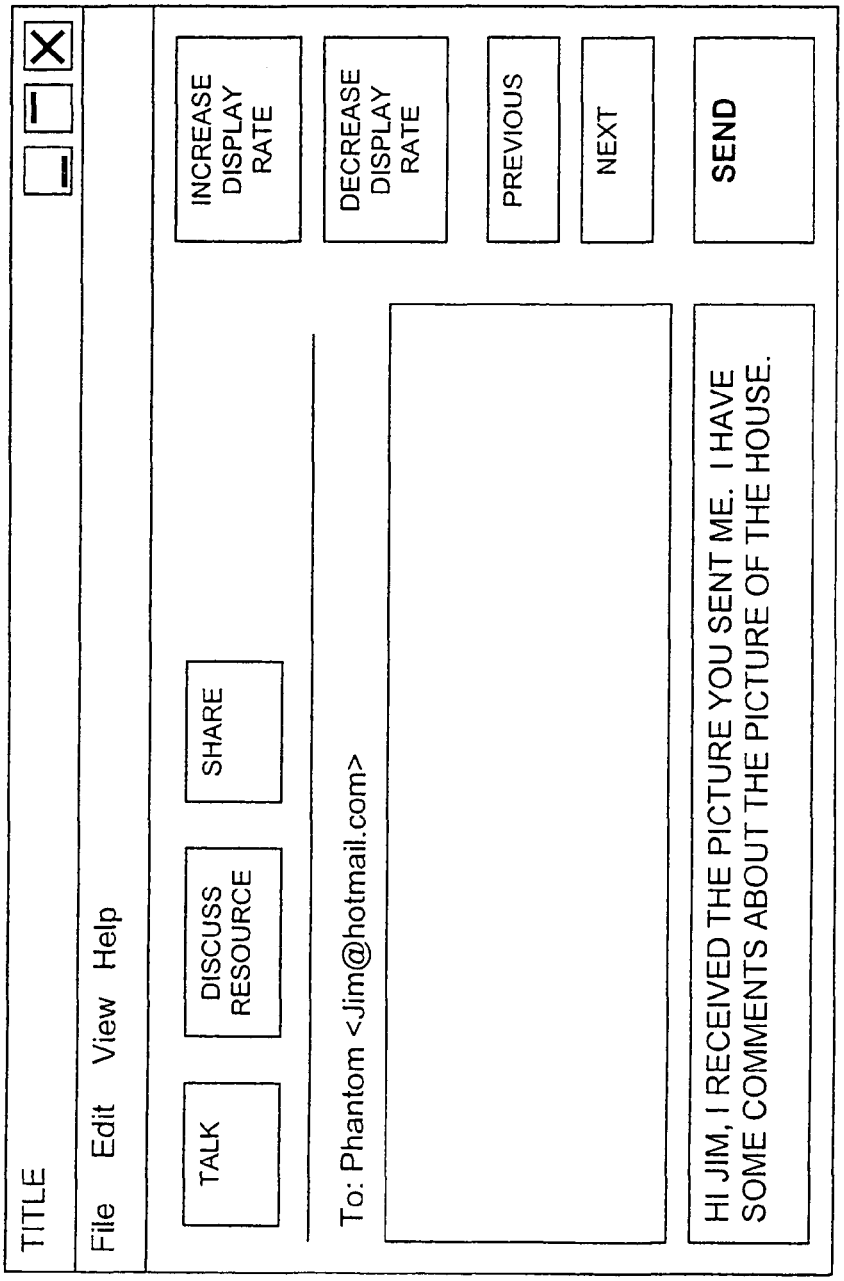
FIG. 8 represents a graphical chat window illustrating a messaging aspect of the present invention, in accordance with one embodiment.

FIG. 8 represents a graphical chat window illustrating a messaging aspect of the present invention, in accordance with one embodiment. The chat window may be displayed in a number of ways including by the user clicking (i.e. with a user input device such as a mouse) on a buddy name and choosing "Chat" in the corresponding menu that pops up. Once the chat window appears, the user can type his message in the chat window and send it to a selected party (in the illustrated example, the selected party if "phantom"). If the user wishes to discuss a digital media resource with his buddy, the user may click on the "Discuss Resource" button on the toolbar in the chat window to pick a file for discussion. Thereafter, the resource selection dialog (previously described) pops up through which the user can select a resource. In one embodiment, the user may select resources he has shared with his buddy, resources his buddy has shared with him, or alternately, a resource that he hasn't yet shared but is nonetheless located on his computer system. The selected resource is then opened in the client viewer on both the user's and the selected buddy's clients. Additionally, the chat window is positioned on top of the displayed resource to facilitate discussion. In one embodiment, resources such as text files or other documents are opened in the appropriate application, such as Word or Excel, instead of in the included client viewer. In one embodiment, either of the user and the selected buddy may opt to increase the resource display rate, decrease the resource display rate, or manually proceed to view the next or previous resources. In one embodiment, the photo-manager client of the present invention integrates with third-party messaging applications such as Instant messenger from AOL, Yahoo! Messenger, or Windows Messenger to utilize preexisting buddy lists from these applications.

While the present invention has been described in terms of the above-described embodiments, the present invention is not limited to the embodiments described. As the present invention can be practiced with further modification and alteration within the spirit and scope of the appended claims, the description is to be regarded as illustrative instead of restrictive on the present invention.

What is claimed is:

1. A method for a server computing device to facilitate exchange of digital images between other computing devices, the method comprising:

under control of the server computing device, receiving information from a user of a first remote computing device that identifies one or more other users of other remote computing devices, the identified one or more other users each being selected by the user as a resource-sharing partner of the user;

receiving one or more indications from the first remote computing device that identify one or more digital images stored at the first remote computing device to be shared with the identified one or more other users;

after a connection with the first remote computing device is established, automatically facilitating exchange of digital images between the user and other users by receiving from the first remote computing device the identified digital images to be provided to the identified other users and by transparently sending to the first remote computing device one or more other digital images previously identified by one or more other users to be shared with the user of the first remote computing device, the sending of the one or more other digital images initiating displaying of the one or more other digital images by the first remote computing device;

storing the identified digital images received from the first remote computing device; and transparently sending the identified digital images received from the first remote computing device to at least some of the identified other users, the identified other users including multiple users.

2. The method of claim 1 further comprising exchanging one or more types of digital media resources other than digital images between the user and the other users by receiving from the first remote computing device one or more digital media resources of the one or more types to be provided to identified other users and by transparently sending from the server device to the first remote computing device one or more other digital media resources of the one or more types that were previously identified by one or more other users to be shared with the user of the first remote computing device.

3. The method of claim 1 wherein the one or more other digital images include multiple other digital images, and wherein the displaying of the other digital images by the first remote computing device includes interchangeably displaying the multiple other digital images as digital wallpaper on the first remote computing device.

4. The method of claim 1 wherein the one or more other digital images include multiple other digital images, and wherein the displaying of the other digital images by the first remote computing device includes sequentially displaying the multiple other digital images on the first remote computing device for a predetermined amount of time.

5. The method of claim 1 wherein the automatic facilitating of the exchange of digital images between the user and the other users includes receiving from the first remote computing device a user name of the user of the first remote computing device for use in identifying the one or more other digital images previously identified to be shared with the user of the first remote computing device.

6. The method of claim 1 wherein the storing of the identified digital images to be provided to the identified other users includes temporarily storing the identified digital images to enable subsequent delivery to remote computing devices associated with the identified other users.

7. The method of claim 1 wherein each of the identified other users to whom the identified digital images are to be provided have designated the user of the first remote computing device as a resource-sharing partner.

8. The method of claim 1 wherein the user of the first remote computing device and the identified other users are part of a community of numerous users who interact with the server device.

9. The method of claim 1 further comprising, after the transparent sending of the identified digital images to each of the identified other users, deleting the stored digital images.

10. The method of claim 1 further comprising deleting the stored digital images after a predetermined period of time has expired despite at least one of the multiple users having not received at least one of the stored digital images.

11. The method of claim 1 wherein the sending of the one or more other digital images by the server device to the first remote computing device occurs at a time when a computing device of one of the one or more other users who previously identified those digital images to be shared with the user of the first remote computing device is not connected to the server device.

12. The method of claim 1 further comprising, under control of the first remote computing device, receiving the transparently sent one or more other digital images in the background for the first remote computing device while the user of the first remote computing device performs other tasks on the first remote computing device.

13. The method of claim 1 further comprising, under control of the first remote computing device, receiving the transparently sent one or more other digital images automatically and without explicit approval of the user of the first remote computing device.

14. The method of claim 1 further comprising, after the sending of the one or more other digital images previously identified by the one or more other users, receiving from the first remote computing device a rating for one of the sent one or more other digital images that was previously identified by one of the one or more other users, and providing an indication of the rating to at least the one other user.

15. The method of claim 1 further comprising, after the sending of the identified digital images to the at least some identified other users, receiving feedback from each of one or more of the at least some identified other users regarding the sent digital images.

16. The method of claim 15 wherein the received feedback is based on combining ratings received from multiple of the at least some identified other users for one of the sent digital images.

17. The method of claim 1 wherein the method further comprises, under control of the first remote computing device, automatically displaying at least one of the sent other digital images as a screen saver on the first remote computing device.

18. The method of claim 1 wherein the first remote computing device is a palmtop computer.

19. The method of claim 1 wherein the first remote computing device is a PDA.

20. The method of claim 1 wherein the first remote computing device is a portable device.

21. The method of claim 1 further comprising, under control of the first remote computing device, and after receiving the sent one or more other digital images previously identified by the one or more other users, performing editing of at least some of those received digital images in response to instructions from the user of the first remote computing device.

22. The method of claim 21 wherein the editing of the images includes augmenting those images.

23. The method of claim 1 further comprising, under control of the first remote computing device, and after receiving the sent one or more other digital images previously identified by the one or more other users, performing organizing of at least some of those received digital images in response to instructions from the user of the first remote computing device.

24. The method of claim 23 wherein the organizing of the images includes consolidating those images with other images received from a user who provided those images.

25. The method of claim 1 further comprising providing messaging capabilities to enable the user of the first remote computing device to communicate with one or more other users.

26. The method of claim 25 further comprising, after the sending of one of the identified digital images to one of the identified other users, using the messaging capabilities to enable communications between the user of the first remote computing device and the one other user while the one identified digital image is displayed on the first remote computing device.

27. The method of claim 26 further comprising, under control of the first remote computing device, communicating with the one other user by sending one or more messages to the one other user and by receiving one or more other messages from the one other user, and wherein the one identified digital image is further displayed to the one other user on an associated computing device of the one other user during the communicating.

28. The method of claim 26 wherein the communications between the user of the first remote computing device and the one other user includes exchanged text messages.

29. The method of claim 26 wherein the communications between the user of the first remote computing device and the one other user includes exchanged messages with audio content.

30. The method of claim 26 wherein the communications between the user of the first remote computing device and the one other user includes exchanged messages with video content.

31. The method of claim 26 wherein the communications between the user of the first remote computing device and the one other user includes exchanged information from participating in a chat session.

32. The method of claim 1 further comprising, after the sending of the one or more other digital images previously identified by one or more other users, and under control of the first remote computing device, communicating with at least one of the other users while at least one of the other digital images is displayed to the user of the first remote computing device and to the at least one other users.

33. A server computing device, comprising:
a memory; and
a plurality of stored instructions that when executed in the memory cause the server computing device to automatically facilitate exchange of digital media resources between a first remote computing device of a first user and one or more other remote computing devices by, after a connection with the first remote computing device is established:
  receiving one or more indications that identify one or more other users of the other remote computing devices as resource-sharing partners of the first user;
  receiving from the first remote computing device one or more digital media resources local to the first remote computing device that are identified to be shared with the one or more identified users;
  transparently sending from the server to the first remote computing device one or more other digital media resources identified by one or more users to be shared with the first user, the sending of the one or more other digital media resources initiating displaying of at least one of the one or more other digital media resources by the first remote computing device;
  storing the one or more digital media resources received from the first remote computing device; and
  transparently sending the one or more digital media resources received from the first remote computing device to at least some of the one or more identified users, the one or more identified users including multiple users.

34. The computing device of claim 33 further comprising a processor for executing the plurality of stored instructions, and wherein the first remote computing device includes a display device on which the at least one other digital media resources are displayed.

35. The computing device of claim 34 further comprising a storage device for storing the received one or more digital media resources to enable the sending of the one or more digital media resources to the at least some identified users.

36. The computing device of claim 34 further comprising a storage device for storing the other digital media resources before the sending of the one or more other digital media resources to the first remote computing device.

37. The computing device of claim 33 wherein the one or more digital media resources and the one or more other digital media resources are digital images.

38. A non-transitory computer-readable storage medium that stores instructions that when executed cause a server computing device to facilitate exchange of digital images between other computing devices, by performing a method comprising:
  receiving one or more indications that identify one or more digital images stored locally to a first remote computing device and that identify one or more other remote computing devices having users with which to share the identified digital images, the users of the identified other remote computing devices being selected as resource-sharing partners;
  facilitating exchange of digital images by automatically receiving the identified digital images from the first remote computing device to be shared with the identified other remote computing devices and by automatically sending to the first remote computing device one or more other digital images identified to be shared with the first remote computing device that are provided by one or more remote computing devices, the sending of the one or more other digital images initiating displaying of at least one of the one or more other digital images by the first remote computing device;

storing the identified digital images received from the first remote computing device; and transparently sending the identified digital images received from the first remote computing device to at least some of the identified other remote computing devices, the identified other remote computing devices including multiple other remote computing devices.

39. The non-transitory computer-readable storage medium of claim 38 wherein the other remote computing devices are identified based on received indications of the resource-sharing partner users who are associated with those remote computing devices.

40. The non-transitory computer-readable storage medium of claim 38 wherein the computer-readable medium is a memory of the computing device.

* * * * *